(12) United States Patent
Kline

(10) Patent No.: US 11,673,695 B2
(45) Date of Patent: Jun. 13, 2023

(54) DEPLOYABLE FAIRING FOR RIDESHARE SATELLITES

(71) Applicant: Lockheed Martin Corporation, Bethesda, MD (US)

(72) Inventor: James Eric Kline, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 98 days.

(21) Appl. No.: 17/003,390

(22) Filed: Aug. 26, 2020

(65) Prior Publication Data

US 2022/0063845 A1 Mar. 3, 2022

(51) Int. Cl.
*B64G 1/64* (2006.01)
*B64G 1/22* (2006.01)
*B64G 1/46* (2006.01)
*B64G 1/42* (2006.01)

(52) U.S. Cl.
CPC .............. *B64G 1/641* (2013.01); *B64G 1/222* (2013.01); *B64G 1/428* (2013.01); *B64G 1/46* (2013.01); *B64G 2001/643* (2013.01)

(58) Field of Classification Search
CPC .. B64G 1/0641; B64G 2001/643; B64G 1/64; B64G 1/46; B64G 1/428; B64G 1/222; B64G 1/54; B64G 1/1543; B64G 1/1546; B64G 1/56; B64G 1/641
USPC ................ 244/171.1, 171.3, 171.7
See application file for complete search history.

(56) References Cited

U.S. PATENT DOCUMENTS

| | | | |
|---|---|---|---|
| 5,152,482 A * | 10/1992 | Perkins ..................... | B64G 1/22 244/159.4 |
| 6,276,639 B1 * | 8/2001 | Hornung ................ | B64G 1/002 102/489 |
| 7,036,773 B2 * | 5/2006 | Caldwell ................ | B64G 1/002 244/173.3 |
| 8,550,408 B2 * | 10/2013 | Ross ....................... | B64G 1/641 244/173.1 |
| 9,718,565 B1 * | 8/2017 | Lim ........................ | B64G 1/641 |
| 11,447,276 B2 * | 9/2022 | Arulf ...................... | B64G 1/002 |
| 2014/0131521 A1 * | 5/2014 | Apland .................. | B64G 1/641 244/173.3 |

(Continued)

FOREIGN PATENT DOCUMENTS

| | | | | |
|---|---|---|---|---|
| CN | 106516172 A | * | 3/2017 | |
| KR | 20180034121 A | * | 4/2018 | |
| WO | WO-2008034550 A1 | * | 3/2008 | ............. B64G 1/641 |

OTHER PUBLICATIONS

Mehta, "Analysis of payload compartment venting of satellite launch vehicle," Jul. 8, 2016, Advances in Aircraft and Spacecraft Science, vol. 4 (Year: 2016).*

(Continued)

*Primary Examiner* — Joshua J Michener
*Assistant Examiner* — Ryan Andrew Yankey

(57) ABSTRACT

Provided herein are various improvements to launch vehicle payload systems, such as employed to launch and deploy secondary payloads into orbit. In one example, a system includes a fairing configured to encase a payload within an envelope of a primary fairing of a launch vehicle, and a mount system configured to adapt a mounting port for the payload to a mounting port associated with the launch vehicle. The system also includes a fairing door configured to be commanded open for deployment of the payload after the primary fairing has open.

16 Claims, 6 Drawing Sheets

(56) References Cited

U.S. PATENT DOCUMENTS

2014/0319283 A1* 10/2014 Holemans .............. B64G 1/641
                                                      244/173.3
2016/0031572 A1*  2/2016 Dube .................... B64G 1/641
                                                      244/173.3
2022/0194632 A1*  6/2022 Aston .................... B64G 1/50

OTHER PUBLICATIONS

Miller, Roy, "Dual Spacecraft System," United Launch Alliance, LLC, 4 pages, 2011.
Moog, "ESPA User's Guide—The EELV Secondary Payload Adapter," 26 pages, Nov. 2018.
Perry, Bill, "ESPA: An Inexpensive Ride To Space For Secondary Payloads," Milsat Magazine, 3 pages, Jul. 2012.
Space and Missile Systems Center, "Evolved Expendable Launch Vehicle Rideshare User's Guide," 31 pages, May 2016.
Space Exploration Technologies Corp., "Falcon User's Guide," 72 pages, Apr. 2020.

\* cited by examiner

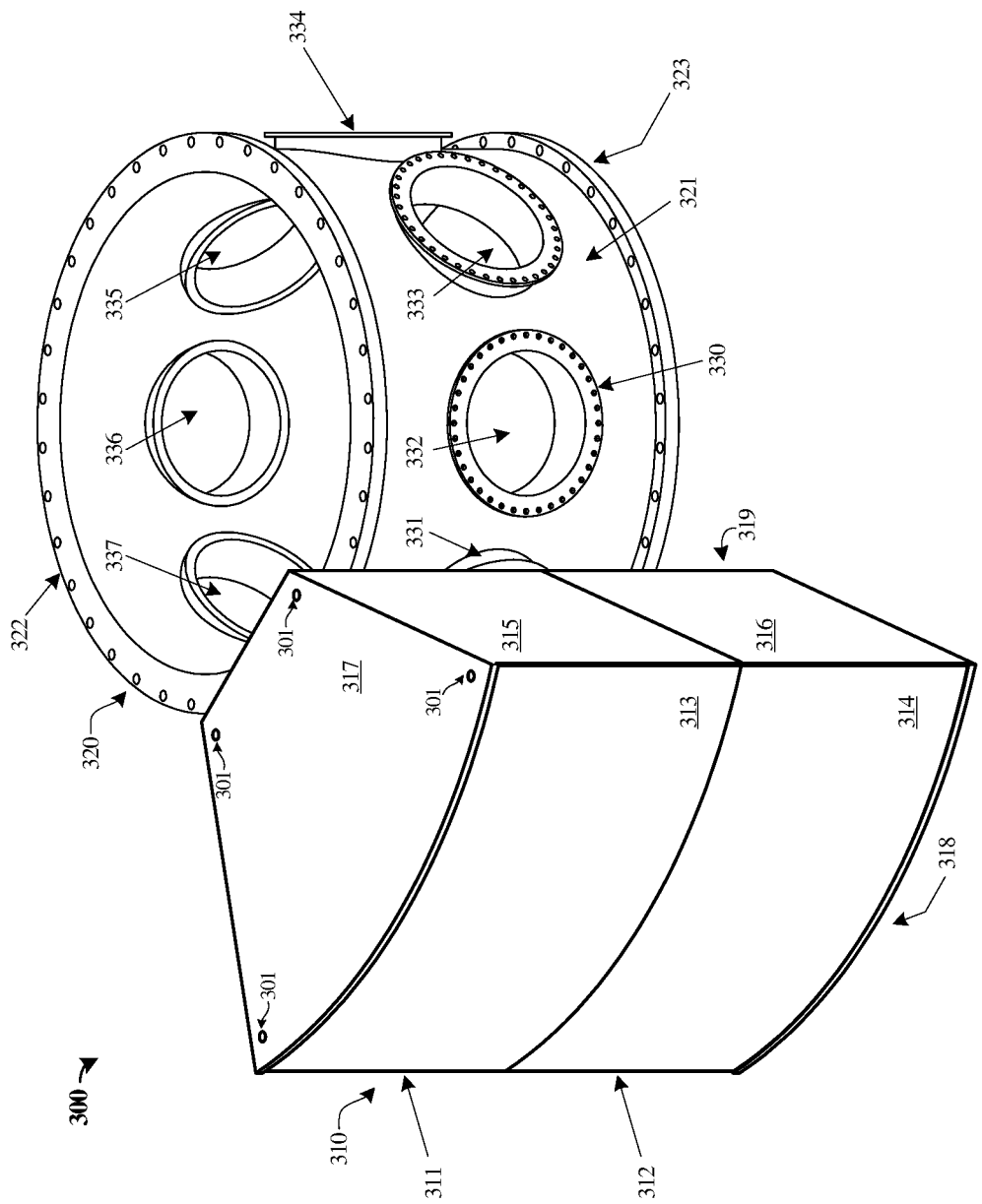

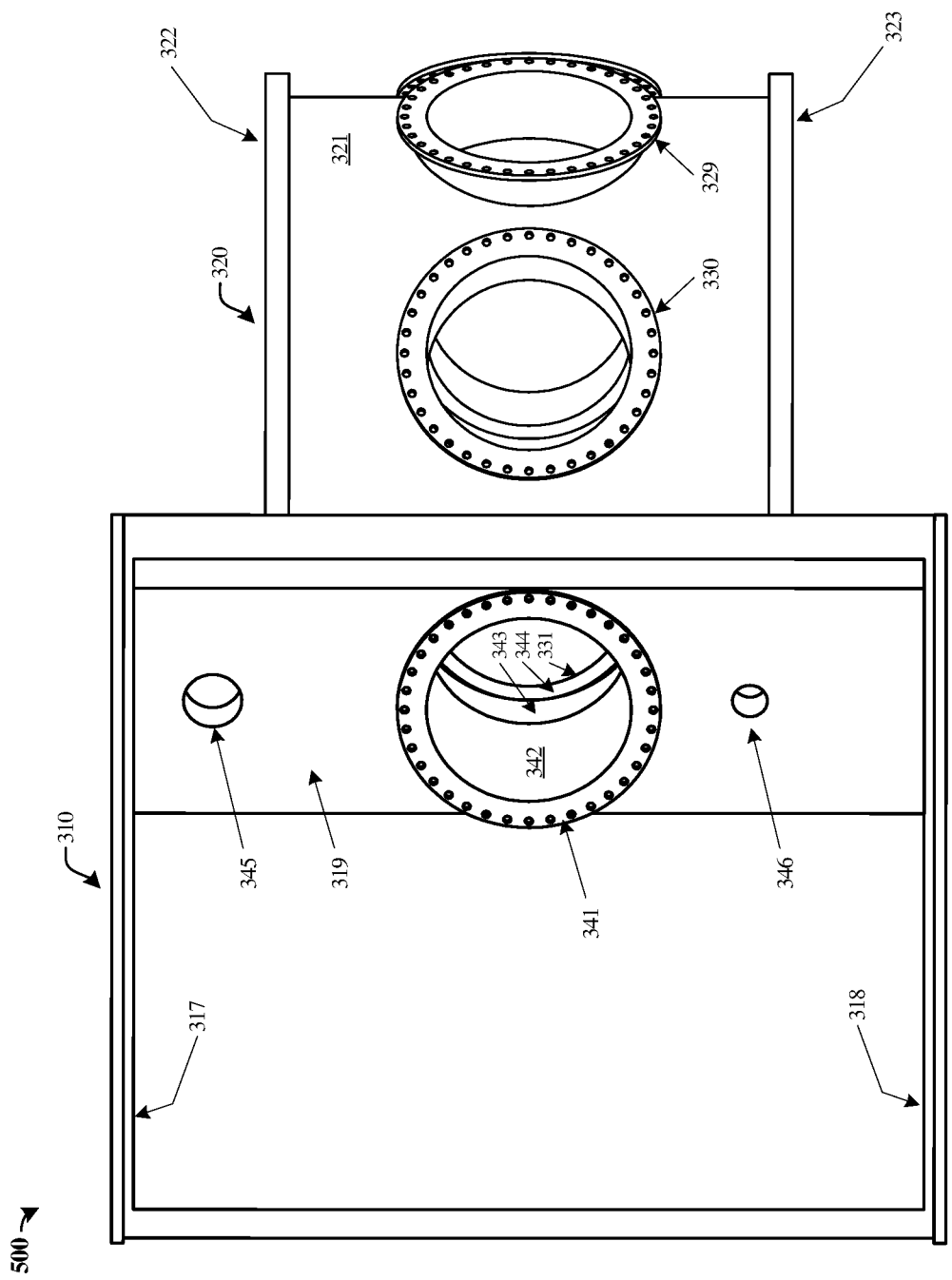

DEPLOYABLE FAIRING FOR RIDESHARE SATELLITES

TECHNICAL BACKGROUND

Spacecraft of various types can be carried by launch systems, such as rocket vehicles, into orbits about central bodies or into other trajectories and configurations in space. One form of spacecraft, often referred to as satellites, can be placed into orbit and these satellites can perform various tasks, such as sensing, surveillance, communications, or scientific experimentation. However, getting satellites into orbit can be an expensive endeavor, even with advances in rocket launch technology and the advent of commercial launch entities. Ridesharing has become a popular option for payloads, such as satellites, to share a launch vehicle with another payload. Typically, a launch vehicle will have a primary mission and payload, but the launch vehicle may have additional payload capacity to spare. Secondary payloads, sometimes referred to as hosted payloads, can rideshare with the primary payload and achieve orbit without having a dedicated launch vehicle and associated costs. Moreover, some satellites are small in form factor, and many small satellites might share a launch vehicle, such as for constellations of communication or imaging satellites.

Example rideshare or hosted launch systems include the Space Exploration Technologies Corp. (SpaceX) Rideshare program, Moog/Spaceflight hosted payloads, Spaceflight Sherpa vehicles, and United Launch Alliance (ULA) Dual Spacecraft System 4 (DSS-4), among other smallsat deployers, space tugs, and platforms for hosted payloads. Some rideshare systems are based around the Evolved Expendable Launch Vehicle (EELV) Secondary Payload Adapter (ESPA) ring, which is an adapter standard for launching secondary payloads on orbital launch vehicles along with primary payloads. Typically, an ESPA ring, or other ridesharing configurations that carry secondary payloads, are positioned below a primary payload on a vertically launched vehicle. The environment internal to a fairing of a launch vehicle can have contaminants such as outgassing, particulate matter generation, and moisture condensation, among other contaminants, which are generated, agitated, or redistributed during the violent launch process. While the primary payload may benefit from a physical positioning 'higher' in the fairing envelope, secondary payloads often are positioned lower in the fairing envelope and experience a higher degree of contamination during launch.

OVERVIEW

Secondary payloads can be carried, along with primary payloads, by rocket launch vehicles into orbits or other trajectories. However, secondary payloads can suffer from harsher environments and launch profiles due to positioning below a primary payload under a shared payload fairing. Many secondary payloads are carried on standardized rideshare structural rings or structures, such as provided by the ESPA ring standard, Sherpa-FX vehicle, or other structures including orbital transfer vehicles, smallsat deployers, space tugs, and platforms for hosted payloads. Provided herein are various improvements to launch vehicle payload systems, such as employed to launch and deploy secondary payloads into orbit. In one example, a system includes a secondary fairing configured to encase a secondary payload within an envelope of a primary fairing of a launch vehicle, and a mount system configured to adapt a mounting port for the secondary payload in the secondary fairing to a mounting port associated with the launch vehicle. The system also includes a fairing door configured to be commanded open for deployment of the secondary payload after the primary fairing has open.

In another example, a secondary payload system for a launch system includes a fairing structure configured to provide an internal environment for a secondary payload separate from that of a primary fairing of the launch system. The secondary payload system also includes an internal mount interface configured to couple to the secondary payload, an external mount interface configured to couple to a payload port of a payload rideshare structure of the launch system, and a door configured to open for deployment of the secondary payload.

In yet another example, a launch system payload apparatus is provided that includes a fairing means for providing an internal environment for a secondary payload separate from that of a primary fairing of a launch system. The launch system payload apparatus also includes a first mounting means for securing the secondary payload in the fairing means, a second mounting means for coupling the fairing to the launch system, and a deployment means for deploying the secondary payload from the fairing means.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 2 illustrates

FIG. 3 illustrates an oblique view of payload system in an implementation.

FIG. 5 illustrates a cross-sectional view of a payload system in an implementation.

DETAILED DESCRIPTION

Figure 1:
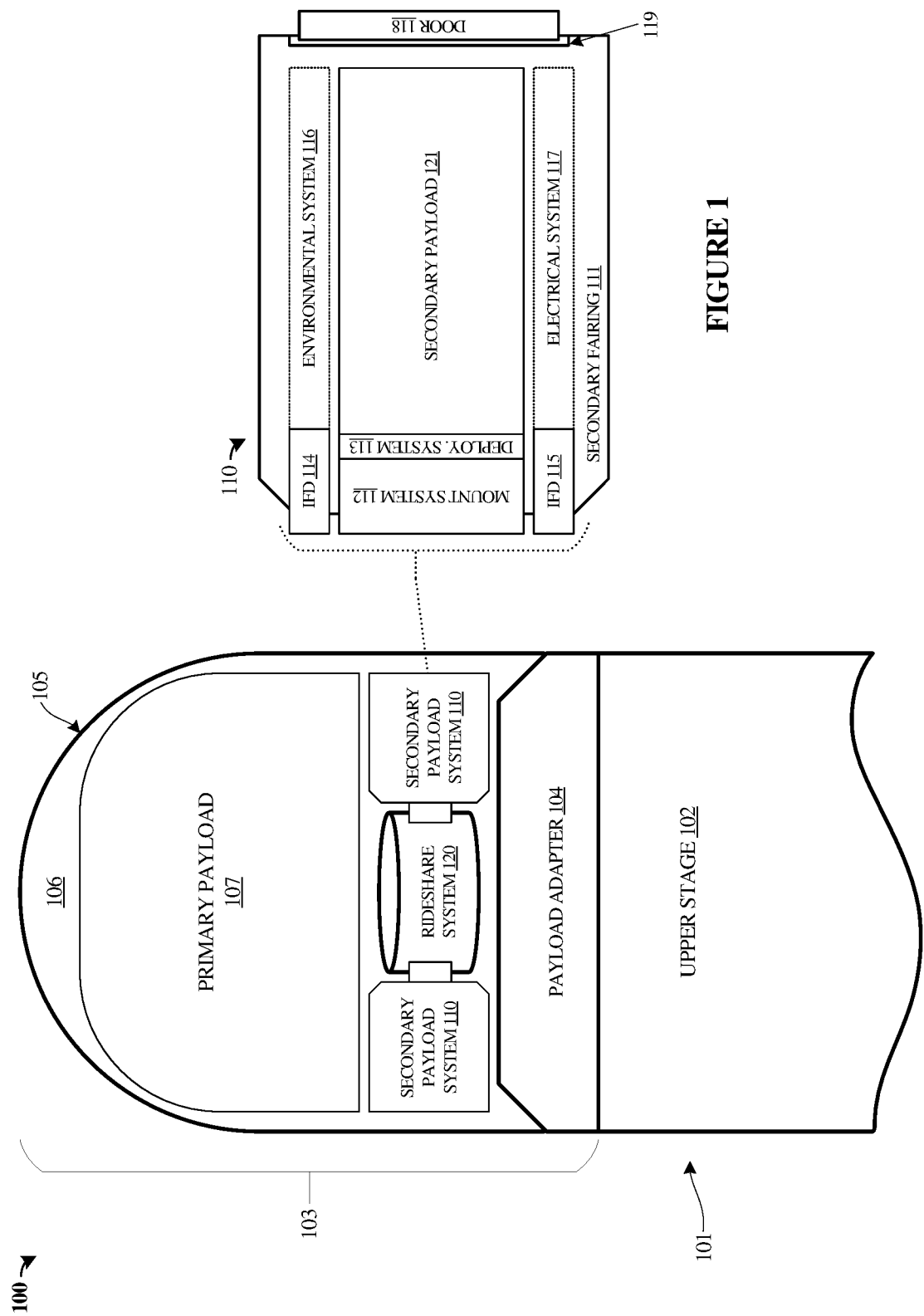
FIG. 1 illustrates a payload system in an implementation.

Spacecraft of various types can be carried by launch vehicles, such as rockets, into orbit or onto other trajectories. Due in part to the sizing of launch vehicles as well as the costs associated with achieving orbit, ridesharing of secondary payloads along with primary payloads on launch vehicles has become a popular option, especially for smaller secondary payloads. Likewise, ridesharing of many smaller payloads without a primary payload has also increased in popularity for deploying large constellations of satellites. In some cases, a launch vehicle will have a primary mission and payload, but the launch vehicle may have additional payload capacity to spare. Launch vehicles carry the satellites or payloads in a forward area that is typically covered by a fairing or nose cone to create an aerodynamic shape and protect the payloads from the environment until the fairing is ejected. However, the environment internal to the fairing can have contaminants including particulate matter, outgassing, and moisture condensation, among other contaminants, which are generated, agitated, or redistributed during the launch process. As satellite ridesharing grows in usage, operators of contamination-sensitive payloads have to spend considerable effort to protect these payloads during launch. This can be especially problematic when some payloads are located below other payloads that benefit from higher positioning in the fairing, leading to more contamination for the lower payloads. Thus, certain payloads, such as secondary payloads or hosted payloads, can experience contamination-related end-of-life (EOL) issues before the payloads can even enter into a beginning of life (BOL) phase.

Example ridesharing arrangements employ the use of a secondary mounting assembly which carries one or more secondary payloads, sometimes referred to as a payload adapter or multi-payload adapter (MPA). This secondary mounting assembly can sit below a primary payload, or when no primary payload is carried, several secondary mounting assemblies can be included in an array that fills the entire payload space. Each secondary mounting assembly can provide for mounting several smaller payloads to a main payload adapter on a launch vehicle. This main payload adapter might carry a primary payload, or may instead merely secure a large number of small payloads via several secondary mounting assemblies to the launch vehicle. One such secondary mounting assembly is the Evolved Expendable Launch Vehicle (EELV) Secondary Payload Adapter (ESPA) ring. This ESPA ring is an adapter standard used for launching secondary payloads on orbital launch vehicles along with primary payloads. One or more ESPA rings typically sit below a primary payload that can also be mounted onto the top of an ESPA ring. ESPA style of mounting rings come in several sizes and may include propulsion to carry associated satellites into various orbits. Other mounting assemblies include the Sherpa-FX orbital transfer vehicle, the Composite Adapter for Shared Payload Rides (CASPAR), and the Flat-Plate Adapter (FPA).

An ESPA ring can have a variable amount of mounting ports arrayed about a central axis. For example, four (4), six (6), eight (8), or even twelve (12) mounting ports can be arrayed about a central axis, with the diameter of the mounting ports inversely proportional to the quantity of ports. These ports allow for secondary payloads to be coupled to mounting features of the mounting ports, such as via a circle of bolts. An ESPA ring can also have a top and bottom set of mounting features to couple the ESPA ring to a launch vehicle, to a primary payload, or to further ESPA rings. An ESPA ring can be qualified to carry a certain amount of total mass, which may vary based on implementation and the quantity of mounting ports. Through each mounting port a set of payload connections can be routed, such as umbilical connections, power, heating/cooling lines, telemetry lines, and other similar links. In a specific example, a baseline ESPA ring is qualified to carry 257 kilograms (kg), a heavy ESPA ring is qualified to carry 450 kg, and an ESPA Grande is qualified to carry 700 kg. As mentioned above, the apparatuses and systems herein are not limited to the ESPA standard, but instead use this merely as one implementation. Depending on launch provider, a rideshare system might not comprise a ring configuration. A rideshare system could comprise triangular, rectangular, hexagonal, n-sided polygonal, or some arbitrary or hybrid shape. The examples herein apply to any such shape or configuration capable of carrying one or more secondary payload fairings.

While several rideshare and secondary payload mounting systems have been developed, secondary payloads that employ these mounting systems still are affected by unwanted contaminant intrusion and adverse environmental effects both during storage prior to launch and, more significantly, during launch. The examples herein include a secondary fairing/cover around a secondary payload, such as a rideshare satellite, which is typically provided in addition to a main fairing associated with the launch vehicle and primary payload. The secondary fairing can also be referred to as a deployable cover for a secondary payload. The secondary fairing can be activated for deployment of the secondary payload after separation from the payload adapter at a target altitude or orbit. Locking mechanisms can be included for doors of the secondary fairing, and these locking mechanisms can include frangible bolts or pin puller mechanisms. Although the secondary fairings discussed herein comprise minimal moving parts, such as payload separation mechanisms, some moving components are employed do open or deploy doors on the secondary fairings. These door mechanisms can include hinge mechanisms, door motor/spring systems, door release mechanisms, or spring sensor/door catch systems. Internal payload sizes can range from payloads of 100 kg to 1000 kg, among other masses. Various internal payload shapes can also be employed, and thermally isolated internal environments can be provided during ascent of the launch vehicle.

An impermeable or semi-impermeable protective secondary fairing is applied to the secondary payload, either prior to mounting the secondary payload on a mounting assembly or after mounting of the secondary payload onto the mounting assembly. This secondary fairing can be configured to provide a semi-hermetic environmental seal such that contamination-sensitive hardware will be isolated from the otherwise contaminant-rich environment inside a main fairing. The secondary fairing in its entirety can be assembled with a corresponding secondary payload and thermally sterilized according the needs of the application. This provides for a separately configurable environmental subset for specific secondary payloads which can differ from the environment of the main or primary payload under the main fairing. Pressure-sealed secondary fairings can be employed, having designed-in leaks, ports, or apertures to prevent ground overpressure and allow for ascent venting away from the internal secondary payload. This secondary fairing thus provides for more contaminant-free ground or storage environment, as well as cleaner launch and ascent phases. Moreover, this secondary fairing can be configured to not add to unwanted debris in orbit, referred to as space junk, since components of the secondary fairing can remain attached to the rocket booster or upper stage for eventual deorbit or disposal orbit. The addition of secondary payload fairings and associated components can increase the launch weight for a launch vehicle, consuming perhaps 100 kilograms of additional propellant for the launch vehicle. Usage of specialized materials, such as honeycomb or composite panels for portions of the secondary fairings can reduce this launch weight further. However, the addition of secondary fairings and associated components can lead to several advantages that will be discussed herein.

Turning now to one example implementation of an enhanced secondary fairing system, FIG. 1 is presented. FIG. 1 comprises a system diagram illustrating system 100. System 100 includes launch vehicle 101 comprised of upper stage 102 and payload section 103. Payload section 103 includes payload adapter 104 and primary fairing 105. Primary fairing 105 establishes an internal payload envelope or payload space which contains primary payload 107 and rideshare system 120 which supports one or more secondary payloads. In this example, the secondary payloads each comprise an enhanced secondary payload system, shown as two exemplary secondary payload systems 110. Launch vehicle 101 is representative of any rocket, missile, or rocket engine propelled vehicle having a payload section. Launch vehicle 101 might include additional launch stages, such as lower stages, boost stages, boosters, external propellant tanks, or other portions. In other examples, a single-stage launch vehicle is provided, and upper stage 102 is the only stage included in the launch vehicle.

In operation, upper stage 102 will propel payload section 103 to a desired orbit or desired trajectory before initiation of deployment of the payload(s) away from the launch system. Primary payload 107 is typically deployed first, followed by one or more secondary payloads. Secondary payloads are coupled to payload rideshare system 120 in this example. Payload adapter 104 is optionally included to mechanically adapt the launch vehicle to a specific payload type or payload system. Rideshare system 120 mechanically couples the secondary payloads to the launch system, which may position the secondary payloads between upper stage 102/payload adapter 104 and primary payload 107. Other examples may position the secondary payloads in a different position, or integrate features of payload adapter into rideshare system 120. Also, some examples may omit primary payload 107 and instead include one or more instances of rideshare system 120 coupled together in a vertical stackup. When primary payload 107 is included, primary payload 107 may couple to rideshare system or to a common mounting feature that couples to payload adapter 104.

Secondary payload systems 110 are example instances of secondary payloads that can be included in system 100. A different quantity than two secondary payload systems might be included depending on the application and the quantity of payload ports provided by rideshare system 120. Rideshare system 120 can take various forms, but one example includes a ring structure having an array of payload ports about an axial structure. As mentioned above, the Evolved Expendable Launch Vehicle (EELV) Secondary Payload Adapter (ESPA) standard includes one such ring structure for launching secondary payloads on launch vehicles along with primary payloads. The ESPA standard can include ring structures with a different quantity of payload ports, such as 4-12 mounting ports arrayed about a central axis, with the diameter of the mounting ports inversely proportional to the quantity of ports. ESPA rings typically sit below a primary payload and is deployed at a different time than primary payload. It should be understood that the secondary payload systems discussed herein can be applied to any payload system, which may differ from the ring structures or ESPA standards. Each port on the ESPA rings comprises a flange having a circular/perimeter bolt pattern for attaching payloads.

Secondary payload system 110 is shown in detail in FIG. 1. Secondary payload system 110 carries secondary payload 121 within secondary fairing 111, and includes mount system 112, deployment system 113, in-flight disconnects (IFD) 114-115, environmental system 116, electrical system 117, door 118, and door mechanism 119. Secondary fairing 111 comprises a structure and enclosure that encases secondary payload 121 within envelope 106 of primary fairing 105. Thus, secondary fairing 111 forms a separate internal space or envelope for secondary payload 121. This separate envelope can have a different internal environment and internal power or communications properties or arrangement than that of primary fairing 105. Furthermore, secondary payload system 110 can adapt a mounting type of rideshare system 120 to a mounting type of secondary payload 121. This mounting type can differ in mechanical arrangement, mechanical properties, physical sizing, fastener usage, and deployment mechanism. Mount system 112 is provided to adapt an 'external' mounting interface of rideshare system 120 to an 'internal' mounting interface for secondary payload 121. This internal mounting interface can replicate a same type of mounting port of rideshare system 120 for secondary payload 121, or can instead adapt secondary payload 121 to a different type of mounting arrangement, including multiplexing of a one or more payload ports of rideshare system 120 to one or more payload ports for secondary payload 121. Typically, mount system 112 is coupled to a case, chassis, or structure of secondary fairing 111 and structurally supports elements of secondary fairing 111 and secondary payload 121 via the external mounting interface.

In addition to the mechanical or structural interface provided by mount system 112, additional interfaces between launch vehicle 101 and secondary payload 121 can be provided. These additional interfaces comprise electrical power, telemetry connections, communication connections, antenna connections, umbilical connections, cooling/heating ducts or piping, airflow ducts, or other connections and links. IFDs 114-115 are shown as exemplary connections. In FIG. 1, IFD 114 comprises one or more environmental links, while IFD 115 comprises one or more electrical links. Environmental links provide heating/cooling means, such as airflow, fluid exchange, heat exchanger connections, or other links. Electrical links provide electrical power connections, telemetry connections, communication connections, antenna connections, or other similar connections.

Environmental system 116 is provided as a part of secondary fairing 111 and couples to any of IFDs 114-115. Environmental system 116 can provide a set of environmental properties or conditions within secondary fairing 111 for secondary payload 121. These environmental properties establish an environment that differs from that of primary payload 107, other ones of secondary payload systems, or envelope 106 of primary fairing 105. These environmental properties comprise vibration, temperature, pressure, particulate contamination, moisture, and electrical power. Particulate contamination can be isolated using the casing of secondary fairing 111. Particulate contamination might be further reduced using positive pressure within secondary fairing 111 via filtered airflow intake of IFD 114. Pressure isolation can occur along with particulate contamination isolation using sealed portions of secondary fairing 111. Moisture isolation can be provided with sealed portions of secondary fairing 111, as well as via moisture absorbent materials, and humidity control mechanisms. Vibration isolation or reduction can be achieved using various dampening components within secondary fairing 111, such as vibration dampening materials, vibroacoustic materials, sound dampening materials, baffles, springs, shocks, or other elements. Temperature isolation can be achieved using insulation materials, multi-layer insulation, heating elements, vacuum-sealed portions, as well as cooling/heating inputs/outputs channeled through IFD 114, which might include cryogenic cooling fluids, heat pump connections, or chilled propellant of launch vehicle 101.

Electrical system 117 is provided as a part of secondary fairing 111 and couples to any of IFDs 114-115. Electrical system 117 can provide a set of power or electrical signaling properties or conditions within secondary fairing 111 for secondary payload 121. Electrical system 117 establishes a power or electrical signaling environment that differs from that of primary payload 107, other ones of secondary payload systems, or envelope 106 of primary fairing 105. The power or electrical signaling environment can comprise power isolation, power filtering, voltage conversion, communication isolation, signal isolation, or other properties. The isolation for communications or signaling can include inductive or optoelectrical isolation. Power isolation may include various power filtering, transient protection, polarity protection, or transformer isolation.

Deployment system 113 can be included within secondary fairing 111 or as a part of rideshare system 120, including combinations thereof. Deployment system 113 comprises a controller and deployment system electronics. Deployment system 113 can be coupled or bonded to within secondary fairing 111, such as attached to side/back panels or top/bottom panels. Deployment system 113 might be included in controller elements of environmental system 116 or electrical system 117, or located remotely from secondary payload system 110, such as coupled to rideshare system 120 or elsewhere in primary fairing 105. One example has Deployment system 113 coupled to an unused payload port on rideshare system 120. Deployment system 113 (along with controller elements of environmental system 116 or electrical system 117) can include various circuitry, logic, processing elements, memory elements, storage elements, and communication interfaces. Deployment system 113 can comprise one or more microprocessors, microcontrollers, field-programmable gate arrays (FPGAs), application specific integrated circuits (ASICs), discrete logic, or other elements. Deployment system 113 can be implemented within a single processing device but can also be distributed across multiple processing devices or sub-systems that cooperate in executing program instructions to deploy payloads (or control power, communications, or environmental properties) within secondary fairing 111. Examples of controller elements include general purpose central processing units, application specific processors, and logic devices, as well as any other type of discrete circuitry, control logic, or processing device, including combinations, or variations thereof. Deployment system 113 can receive telemetry from launch vehicle 101 to determine when to deploy secondary payloads or open secondary payload doors, among other operations. In some examples, deployment system 113 has one or more timers or sensors that determine when to deploy secondary payloads or open secondary payload doors. Deployment parameters, such as timing, sequencing, telemetry thresholds, or other parameters can be programmed into storage elements of deployment system 113 for use by one or more execution elements.

After launch vehicle 101 or upper stage 102 has reached a target altitude, orbit, or trajectory, then deployment of primary payload 107 and the secondary payloads can occur. Primary payload 107 and secondary payloads might have different orbital destinations or trajectories, and thus may deploy at different times or require on-board propulsion to affect orbital properties after deployment. However, in FIG. 1, deployment system 113 can provide for deployment of secondary payload 121 at a desired time. Deployment system 113 commands door 118 to open and ejects secondary payload 121. During deployment of secondary payload 121, IFDs 114-115 are configured to disconnect to allow separation of secondary payload 121 from secondary fairing 111. Door 118 might comprise a spring-triggered door along with door mechanism 119, which opens upon release of a latch or latching mechanism. In some examples, frangible bolts are employed on a portion of door 118, while a hinged connection is coupled to another portion of door 118. Expansion of the frangible bolts can lead to opening of door 118 about a pivot point of door mechanism 119. Door mechanism 119 can be configured to keep door 118 open to ensure secondary payload 121 does not impact door 118. Other mechanisms, latches, and door configurations are possible. While some examples have secondary payload system 110 remaining attached to rideshare system 120 after deployment of secondary payload 121, other examples can eject secondary payload system 110 from rideshare system 120 before deployment of the secondary payload. Additionally, all or part of rideshare system 120 might be detached or deployed from launch vehicle 101 before deployment of secondary payloads from associated secondary payload systems. These additional examples (ejection of secondary payload system 110 or ejection of rideshare system 120) can lead to lessening of the mass of launch vehicle 101 during transit, which can be utilized for propelling other payloads to different orbits or trajectories.

Figure 2A:
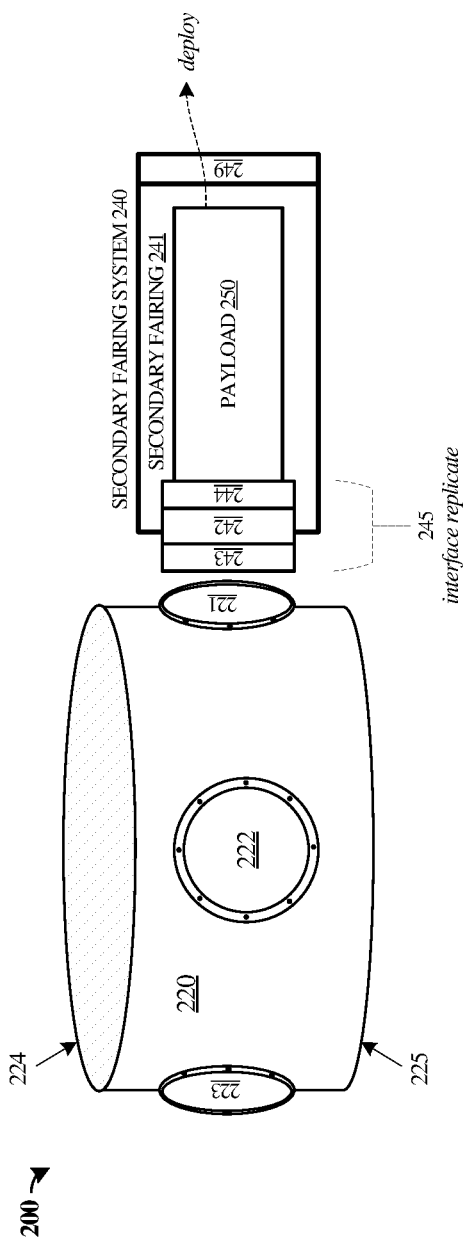
FIGS. 2A and 2B illustrate example payload systems.
Figure 2B:
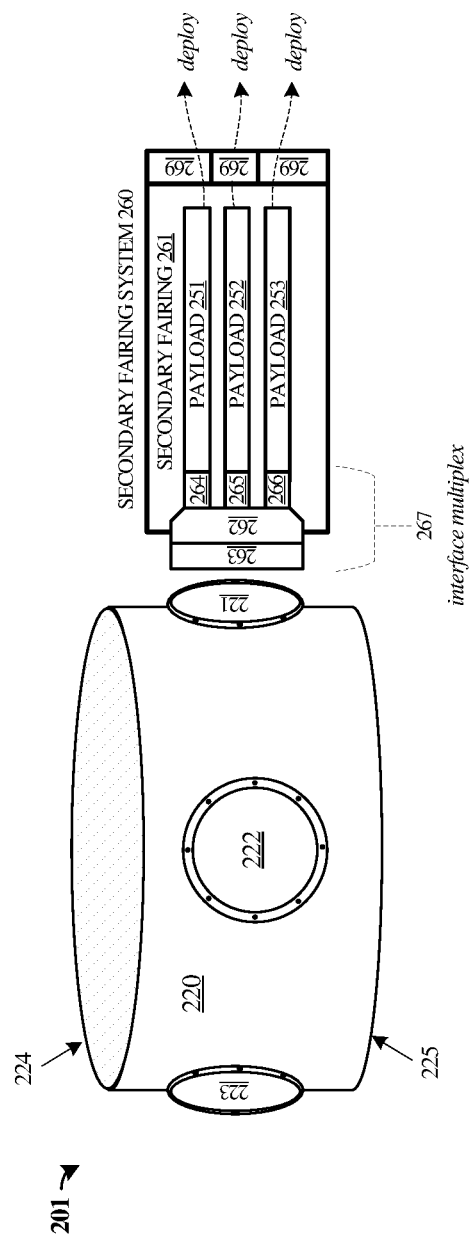

FIGS. 2A and 2B illustrate variations on the examples shown in FIG. 1. Specifically, includes FIGS. 2A and 2B include two payload configurations 200-201. Configuration 200 illustrates payload port replication within a secondary fairing for a secondary payload, along with a payload door. Configuration 201 illustrates payload port multiplexing within a secondary fairing for multiple secondary payloads, along with multiple payload doors. The examples FIGS. 2A and 2B employ an ESPA ring having six payload ports, although it should be understood that other payload support structures and quantities of ports can be employed. Ring 220 comprises several payload ports, with three such visible payload ports 221-223 shown in FIGS. 2A and 2B. Each payload port has a pattern of bolt mounting features arrayed on a flange to coupling secondary payloads thereto. However, instead of directly coupling the secondary payloads to the payload ports of ring 220, a secondary fairing system is employed which houses the secondary payload and establishes a mechanical interface to the payload port of ring 220.

Turning first to configuration 200, secondary fairing system 240 couples to payload port 221 of ring 220 via mount system 245. Mount system 245 includes mount body 242, external mount interface 243, and internal mount interface 244. In this example, mount system 245 replicates or reproduces a mount configuration of payload port 221 within secondary fairing 241. As such, external mount interface 243 and internal mount interface 244 comprise a similar mount type, defined at least by a port diameter and bolt pattern. Thus, internal mount interface 244 replicates a flange of payload port 221 for coupling to payload 250. Payload 250 mounts to internal mount interface 244 in a similar manner to which payload 250 might mount to payload port 221. However, due to the replication of payload port 221 within secondary fairing 241, payload 250 can be enclosed within a separate environment than that of a primary payload and primary fairing. Door 249 is also included which can be commanded to be opened for deployment of payload 250 from secondary fairing 241. Additional inspection doors or access panels can be included in secondary fairing 241 in addition to door 249, such as for access by technicians or operators prior to launch of payload 250 during launch preparation operations. These additional doors or panels are typically closed and sealed prior to launch.

Turning first to configuration 201, secondary fairing system 240 couples to payload port 221 of ring 220 via mount system 267. Mount system 267 includes mount body 262, external mount interface 263, and internal mount interfaces 264-266. In this example, mount system 267 multiplexes or fans-out a mount configuration of payload port 221 within secondary fairing 261. As such, external mount interface 263 and internal mount interfaces 264-266 comprise different mount types, defined at least by different port diameters and bolt patterns. Thus, internal mount interfaces 264-266 each have a corresponding flange different than that of payload port 221 for coupling to multiple payloads 251-253. Due to the multiplexing of payload port 221 within secondary fairing 261, multiple payloads 251-253 can be enclosed within a separate environment than that of a primary payload and primary fairing. Individual doors 269 are also included which can be commanded to be opened for deployment of payloads 251-253 from secondary fairing 261. Each door can have different sizing and characteristics, and can be commanded to open different times than other doors. However, other examples might have a single door that can accommodate deployment of all three payloads 252-253. Additional inspection doors or access panels can be included in secondary fairing 261 in addition to doors 269, such as for access by technicians or operators prior to launch of payloads 252-253 during launch preparation operations. These additional doors or panels are typically closed and sealed prior to launch.

Figure 4:
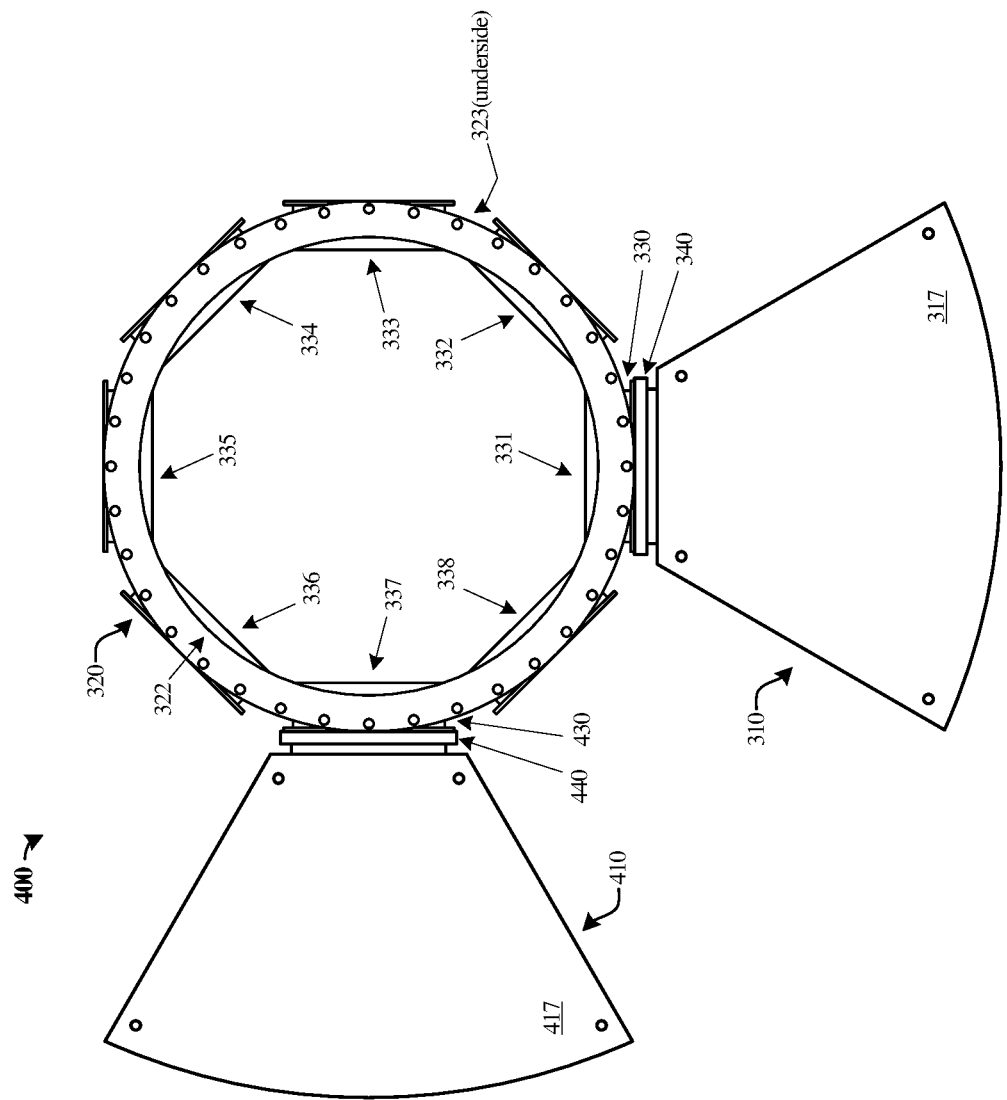
FIG. 4 illustrates an overhead view of a payload system in an implementation.

FIGS. 3-5 illustrates various views of another configuration of secondary payload system. FIGS. 3-5 include secondary payload ring 320 which has eight (8) payload ports 331-338, with port 338 hidden from view in FIG. 3. FIGS. 3-5 also include secondary payload system 310, with FIG. 4 including secondary payload systems 310 and 410. Ring 320 has a top flange 322 and bottom flange 323 which can be used to mount ring 320 to further rings, primary payloads, payload adapters, or launch vehicles. Although a particular example payload enclosure size is shown in FIGS. 3-5, this enclosure can be scaled to a size and shape of payload(s). Also, a rounded trapezoid style of payload fairing is shown in FIGS. 3-5. Other shapes of payload fairings or payload envelopes can be employed. These shapes can include cubic or rectangular solids with rectangular cross-sections, among others.

Turning first to FIG. 3, system 300 includes secondary payload system 310 coupled at payload port 331 of secondary payload ring 320. Secondary payload system 310 comprises a dual-door design, and can accommodate a single large payload or two or more smaller payloads. Thus, secondary payload system 310 establishes a modular unit-based sizing for payloads. When the payloads comprise satellites, then one dual-unit modular satellite or two single-unit modular satellites can be housed by secondary payload system 310. Secondary payload system 310 forms a secondary fairing to encase payloads with side panels 315-216 (along with opposite side panels), hinges 311-312, doors 313-314, top/bottom panels 317-318, and back panel 319.

Doors 313-314 can be included in secondary payload system 310 that open separately or in unison via hinges 311-312 to deploy one or more payloads. Doors 313-314 can be mutually secured via spring-tension, with a firing mechanism comprising either frangible bolts or pyrotechnic firing elements. Any space-qualified door mechanism can comprise hinges 311-312, such as pin pullers, springs, and the like can be employed. Doors 313-314 can be right-hand or left-hand opening, or up/down opening. Although FIG. 3 shows hinges 311-312 on the side of doors 313-314, these hinges can instead be above or below doors 313-314 to allow for doors 313-314 to open 'up' or 'down' from the perspective of FIG. 3. Doors with a curved face could open up/down with a single center hinge point, or through use of more complex multi-hinge configurations. Doors 313-314 might be configured to not open on the outside edges. In a multi-payload configuration, doors 313-314 could open from center beam(s), opening to the middle. This configuration reduces the usable fairing volume, but this configuration could be useful to further isolate multiplex payloads from each other. In some examples, doors 313-314 might be jettisoned entirely instead of coupling via hinges 311-312. In an alternative arrangement to hinges 311-312, one or more sets of rails can be provided onto which doors 313-314 can be mounted. These rails can provide for sliding of doors 313-314 open to allow for deployment of associated payloads.

Secondary payload system 310 also includes integral lift points 301. Lift points 301 can be used for installation onto ring 320. Top panel 317 and back panel 319 of secondary payload system 310 are configured to be strong enough to provide lift and attachment points for secondary payload system 310. Top panel 317 and back panel 319 might be attached first to a payload, and then top panel 317 and back panel 319 become payload interaction interfaces for lifting equipment to mount the combined assembly onto a selected payload port of ring 320. The panels forming the fairing of secondary payload system 310 can be formed by conventional metal forming manufacturing techniques, and can instead be formed using additive manufacturing techniques (e.g. 3D printing). Example materials include titanium when payloads are in the 1000 kg range, or additive manufacturing of aluminum or carbon fiber composites for lighter payloads. Other manufacturing techniques and materials can be employed. Typically, side panels 315-316 and doors 313-314 can be of a lighter weight or lighter duty material and thickness than top panel 317 and back panel 319.

FIG. 4 includes a top view 400 of system 300 to highlight all eight payload ports 331-338 of ring 320. View 400 also illustrates an additional secondary payload system 410 included onto ring 320. Secondary payload system 410 includes similar components to secondary payload system 310, but may house a different type of payload. Secondary payload system 410 includes top panel 417 as well as external mounting interface 440 which couples to ring flange 430 of payload port 337. Also shown in FIG. 4 is a top view of secondary payload system 310 which includes top panel 317 as well as external mounting interface 340 which couples to ring flange 330 of payload port 331.

FIG. 5 illustrates view 500 of system 300 which comprises an internal view of secondary payload system 310 with doors removed to expose back panel 319. In view 500, the internal view highlights features of payload port 331 of ring 320 as well as the flange features for ring 320 and secondary payload system 310. Specifically, the flange features include internal mount interface 341 comprising a flange having a bolt pattern configured to mate to a payload. Mount body 342 couples internal mount interface 341 to external mount interface 343 that further comprises a flange having a bolt pattern configured to mate to flange 344 of payload port 331. Example flange sizes can vary according to ring characteristics and application, but in this example a 24" flange size might be employed. Other attachment methods than the circular flanges can be accommodated, such as 4 split-spool restraint devices, 12" flanges, and the like via different through-holes in back panel 319.

View 500 also illustrates in-flight disconnects (IFDs) ports 345-346, which can be examples of IFDs 114-115 of FIG. 1, although variations are possible. These IFDs can comprise replicated or reproduced launch vehicle in-flight disconnects. IFDs ports 345-346 can carry purge gasses, such as nitrogen, as well as other environmental connections mentioned above. In addition, IFDs ports 345-346 can carry various power, signaling, telecommand, and telemetry. The surfaces of the payload fairing of secondary payload system 310 can include various coatings, such as multi-layer insulation or vibroacoustic foam on any internal or external surface. In addition, various environmental components or electrical components can be included to support the payload and to provide environmental isolation for the payload, such as heating elements. A different quantity of IFD ports can be included than shown in FIG. 5.

Figure 6B:
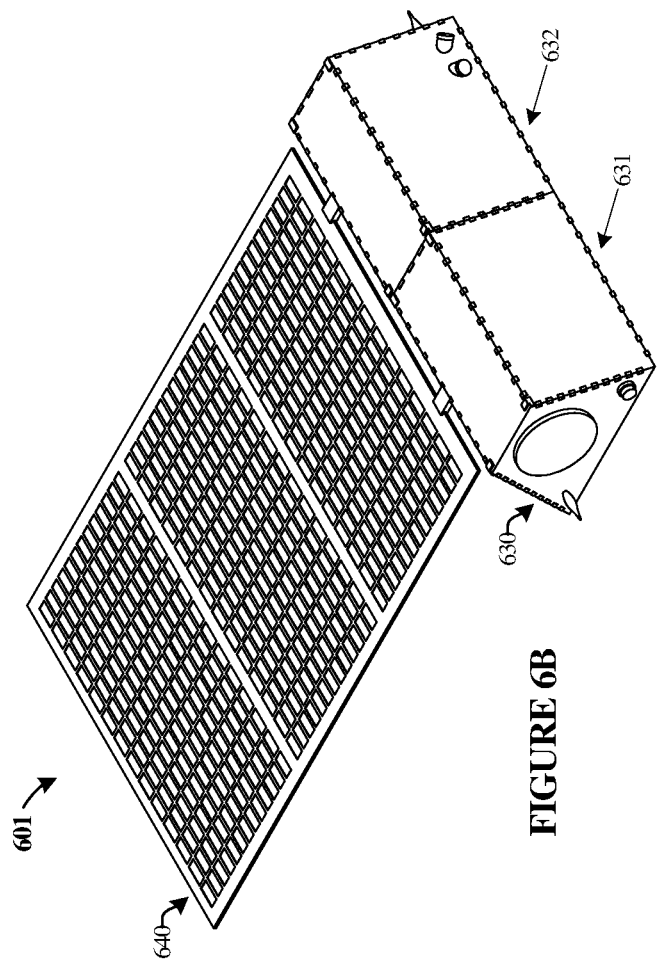
FIGS. 6A and 6B illustrate example modular satellite payloads.
Figure 6A:
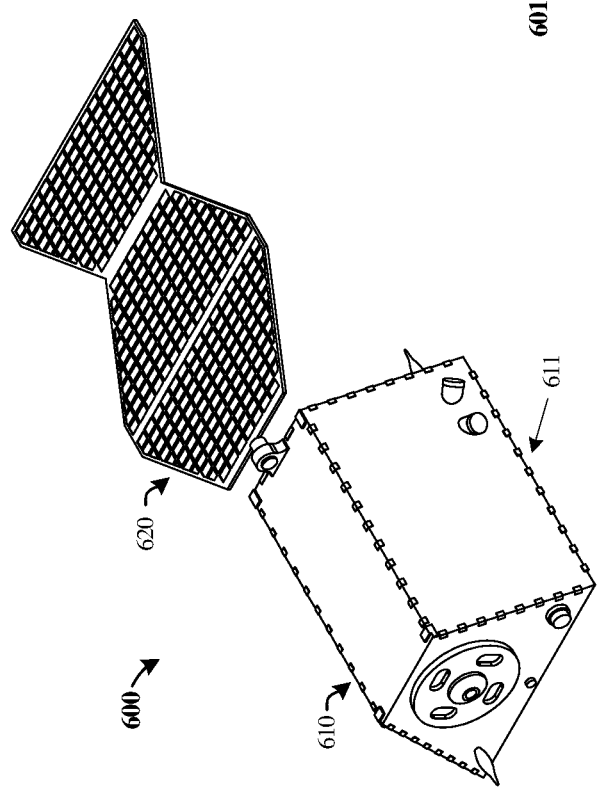

FIGS. 6A and 6B illustrate two example payloads 600 and 601 which can be included as payloads any of the secondary payload systems discussed herein. This example shows Lockheed Martin LM400 style of satellite buses having a single or dual modular design Payloads 600 and 601 comprise satellites with solar panels and bus, although it should be understood that payloads can come in various types and configurations. Payload 600 comprises bus 610 having body 611 and solar panels 620. Payload 601 comprises bus 630 having dual-body 631/632 and solar panels 640. Buses 611 and 631/632 each have trapezoidal solid/prism shapes formed with side panels and top/bottom panels. Payloads 600 and 601 can fit into payload compartments provided by the secondary payload systems discussed herein. For example, secondary payload system 310 might house either of payloads 600 and 601 during launch aboard a launch vehicle. Before deployment, solar panel 620 and 640 are typically folded in an undeployed configuration and positioned tight to body 611 or body 631/632, and after deployment from a launch vehicle the solar panels can be commanded or configured to extend. This example shows Lockheed Martin LM400 style of satellite buses having a single or dual modular design, others could instead be employed.

Advantageously, the secondary fairings or enclosures provided by the secondary payload systems discussed herein can provide separate launch environments for payloads from that of a primary payload under a primary fairing. Also, the examples herein provide adaption between standardized payload mounting structures and secondary payloads to allow any type of secondary payload to couple internally to the secondary fairing to a standardized flange arrangement external to the secondary fairing. Such examples can enable a space organization, such as NASA or a private entity to be truly agnostic to launch providers, at the cost of approximately <100 kg additional launch weight for a 1000 kg payload.

In further implementations of the examples herein, a launch system can include a payload apparatus. The payload apparatus includes a fairing means for providing an internal environment for a secondary payload separate from that of a primary fairing of a launch system. The fairing means can include elements 110-119 of FIG. 1, elements 240-245, and 249 of FIG. 2A, elements 260-267, and 269 of FIG. 2B, elements 301, 310-319, and 340-346 of FIGS. 3-5, and elements 410, 417, and 440 of FIG. 4, among others. The payload apparatus also includes a first mounting means for securing the secondary payload in the fairing means and a second mounting means for coupling the fairing to the launch system. These first and second mounting means include elements 111-112 of FIG. 1, elements 241-244 of FIG. 2A, elements 261-266 of FIG. 2B, elements 315-319 of FIGS. 3-5, and elements 340, 440, and 417 of FIG. 4, among others. The payload apparatus also includes a deployment means for deploying the secondary payload from the fairing means. This deployment means includes elements 113, 118, and 119 of FIG. 1, and elements 311-314 of FIGS. 3-5, among others. The fairing means further provides an internal environment that differs from an environment of a primary fairing of the launch system among one or more environmental properties comprising vibration, temperature, pressure, particulate contamination, moisture, and electrical power.

The examples herein can achieve separate internal environments for payloads different from that of other payloads carried by a launch vehicle—regardless of the other payloads being primary or secondary in designation. Thermal isolation can be employed by the secondary fairing to lower component heater power during ascent, and thereby lower battery drain for secondary payloads. Many times, secondary payloads which are mounted below primary payloads can experience more contamination during launch—due in part to the vibration and acceleration of launch. The examples herein can advantageously provide for a cleaner particulate environment for secondary payloads before jettison from the launch vehicle. This can lead to greater operational lifetimes for payloads, satellites, spacecraft, or space probes, or other types of space-faring vehicles. When security is a concern, the secondary fairings can also provide enhanced protection from external environments during launch and before deployment, such as enhanced resistance to electromagnetic interference, electromagnetic weapons, optical countermeasures or weapons, or resistance to debris encountered before deployment. Moreover, the use of separate secondary fairings can allow operators or technicians to visually determine condition of payloads via external inspection of the fairings or usage of cameras mounted internally to the fairings. Assembly and fitting of the secondary payloads to launch vehicles or launch systems is also assisted by the use of the secondary fairings discussed herein. The physical structure provide by the secondary fairing can allow for assembly of the secondary payload with portions the secondary fairing to form a first assembly, and that first assembly can be lifted or placed onto a rideshare ring or other payload adapter. This first assembly can provide lift points on the secondary fairing so that the secondary payload can be fitted to a launch vehicle without damage to fragile components and systems. Then, further elements of the secondary fairing can be attached to the first assembly to form a final assembly which can be sealed or otherwise closed for launch. As mentioned herein, various access panels can be included for access to the payload after final assembly but prior to launch.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation. Various other advantages and enhanced features are discussed above.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A system, comprising:
    a secondary fairing configured to encase a payload within an envelope of a primary fairing of a launch vehicle and provide an internal pressure environment within the secondary fairing for the payload that differs from a pressure environment of the envelope of the primary fairing, with at least one aperture included on the secondary fairing to prevent overpressure and allow for ascent venting away from the secondary fairing and into the envelope of the primary fairing;
    a mount system configured to adapt a mounting port for the payload to a mounting port associated with the launch vehicle that comprises an Evolved Expendable Launch Vehicle Secondary Payload Adapter (ESPA) ring compatible port, wherein the mounting port for the payload provides an internal port for the payload that replicates the mounting port associated with the launch vehicle such that the internal port comprises a diameter and a bolt pattern matching that of the mounting port associated with the launch vehicle; and
    a fairing door on the secondary fairing configured to be commanded open for deployment of the payload after the primary fairing has open.

2. The system of claim 1, the mount system comprising:
    an additional internal mount interface having a first mounting port type and configured to couple to the payload; and
    an external mount interface having a second mounting port type that differs from the first mounting port type and configured to couple the secondary fairing to the mounting port associated with the launch vehicle.

3. The system of claim 1, wherein the fairing door comprises a hinged connection between the fairing door and the secondary fairing, and wherein the fairing door remains coupled to the secondary fairing after commanded open for deployment of the payload.

4. The system of claim 1, wherein the mounting port for the payload comprises a plurality of mount elements configured to multiplex the mounting port associated with the launch vehicle for a plurality of sub-payloads comprising the payload.

5. The system of claim 1, comprising:
    the secondary fairing configured to further provide an internal environment within the secondary fairing for the payload that differs from an environment of the envelope of the primary fairing among one or more environmental properties comprising vibration, temperature, particulate contamination, and moisture.

6. The system of claim 1, comprising:
    at least one in-flight disconnect (IFD) in the secondary fairing that couples one or more among power and communications for the payload adapted from at least one IFD provided within the envelope of the primary fairing.

7. The system of claim 6, comprising:
    a power system configured to alter properties of the power provided over the at least one IFD for distribution to the payload.

8. A secondary payload system for a launch system, comprising:
    a secondary fairing structure configured to provide an internal pressure environment for a secondary payload that differs from a pressure environment of an envelope of a primary fairing of the launch system and comprising at least one aperture included on the secondary fairing structure to prevent overpressure and allow for ascent venting away from the secondary fairing structure and into the envelope of the primary fairing;
    an external mount interface configured to couple to a payload port of a payload rideshare structure of the launch system that comprises an Evolved Expendable Launch Vehicle Secondary Payload Adapter (ESPA) compatible ring port;
    an internal mount interface configured to couple to the secondary payload and provide an internal port for the secondary payload that replicates the payload port such that the internal port comprises a diameter and a bolt pattern matching that of the payload port; and
    a door on the secondary fairing structure configured to open for deployment of the secondary payload.

9. The secondary payload system of claim 8, comprising:
    an additional internal mount interface comprising a first mounting port type configured to couple to the secondary payload; and
    the external mount interface comprising a second mounting port type that differs from the first mounting port type and configured to couple the secondary fairing structure to the payload port of a payload rideshare structure.

10. The secondary payload system of claim 8, wherein the door comprises a hinged connection between the door and the secondary fairing structure, and wherein the door remains coupled to the secondary fairing structure after commanded open for deployment of the secondary payload.

11. The secondary payload system of claim 8, wherein the internal mount interface comprises a plurality of mount elements configured to multiplex the external mount interface for a plurality of sub-payloads comprising the secondary payload.

12. The secondary payload system of claim 8, comprising:
    the secondary fairing structure configured to further provide an internal environment within the secondary fairing structure for the secondary payload that differs from an environment of the primary fairing among one or more environmental properties comprising vibration, temperature, particulate contamination, and moisture.

13. The secondary payload system of claim 8, comprising:
    at least one in-flight disconnect (IFD) of the secondary fairing structure that couples one or more among power and communications for the secondary payload adapted from at least one IFD provided by the launch vehicle.

14. The secondary payload system of claim 13, comprising:
a power system configured to alter properties of the power provided over the at least one IFD for distribution to the secondary payload.

15. A launch system payload apparatus, comprising:
a secondary fairing means for providing an internal pressure environment for a secondary payload that differs from a pressure environment of an envelope of a primary fairing of a launch system and comprising at least one aperture included on the secondary fairing means to prevent overpressure and allow for ascent venting away from the secondary fairing means and into the envelope of the primary fairing means;
an external mounting means for coupling the secondary fairing means to the launch system and comprising an Evolved Expendable Launch Vehicle Secondary Payload Adapter (ESPA) compatible ring port;
an internal mounting means for securing the secondary payload in the secondary fairing means by at least having an internal port for the secondary payload that replicates the ESPA compatible ring port such that the internal port comprises a diameter and a bolt pattern matching that of the ESPA compatible ring port; and
a deployment means for deploying the secondary payload from the secondary fairing means.

16. The launch system payload apparatus of claim 15, comprising:
the secondary fairing means further providing an internal environment that differs from an environment of the primary fairing among one or more environmental properties comprising vibration, temperature, particulate contamination, moisture, and electrical power.

* * * * *